J. G. H. MEYER.

Improvement in Billiard-Cushions.

No. 131,890.  Patented Oct. 1, 1872.

Witnesses  Inventor

UNITED STATES PATENT OFFICE.

JOHN GEORGE HERMANN MEYER, OF SAN FRANCISCO, CALIFORNIA.

IMPROVEMENT IN BILLIARD-CUSHIONS.

Specification forming part of Letters Patent No. 131,890, dated October 1, 1872.

*To all whom it may concern:*

Be it known that I, JOHN GEORGE HERMANN MEYER, of San Francisco city and county, State of California, have invented an Improvement in Billiard-Cushions; and I do hereby declare the following description and accompanying drawing are sufficient to enable any person skilled in the art or science to which it most nearly appertains to make and use my said invention or improvement without further invention or experiment.

My invention relates to that class of billiard-cushions wherein a strip of steel or other suitable material is inserted in or about the edge of the cushion for the purpose of increasing the force of the rebound by bringing into action a greater number of particles of the rubber which exert their elastic force on the steel spring, and this accumulated force is transmitted from the steel strip to the ball.

It is well-known that rubber is not compressible, though elastic, and the embedding the spring in a solid piece of rubber rather retards than increases the elastic force exerted on the ball, as the rubber bearing against the rear of the steel-spring will not compress, and the steel-spring is inactive until the particles of the entire thickness of the rubber are set in motion.

My invention has for its object to remedy the above defect and to provide means for the necessary displacement of the particles of rubber in the immediate rear of the steel spring, so that the steel spring will act and transmit to the ball the force of its own reaction, as well as the accumulated force gathered from the particles of rubber in contact with it along the line of depression caused by the blow of the ball.

In order to more fully illustrate my invention reference is had to the accompanying drawing forming a part of this specification, in which—

Figure 1:
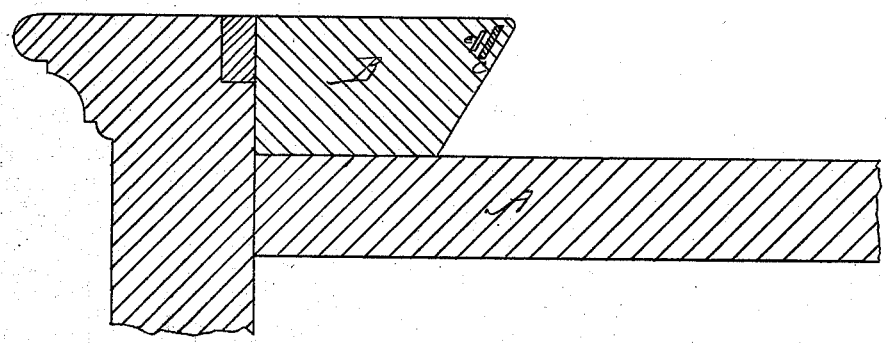
Figure 2:
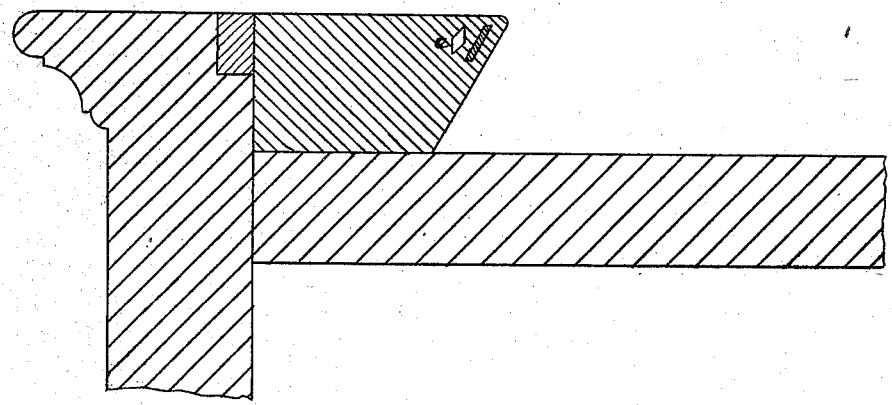

Figure 1 is a transverse section of the side of a table with my improvement, and Fig. 2 shows a modification of the same.

A represents the bed of a billiard-table in section. C is a strip or thin piece of steel, which is inserted in the cushion near its outer edge. I make through the cushion an opening or slot, $e$, which runs the entire length of the cushion parallel to and a short distance in the rear of the strip $c$, and its width is slightly less than that of the strip, so as to give the strip a resisting edge along its top and bottom.

I do not claim, broadly, openings made in billiard-cushions wherein a steel-spring is used, as I am aware of the patents of C. E. Wilcox, of September 3, 1867, and Geo. Smith, August 22, 1871; but in the former a wedge-shaped piece is cut from the top of the rubber down into it near its back edge, thus requiring the large body of the rubber to be put in motion before the steel-spring comes into play. In the latter patent the rubber between the cuts and the steel-spring is not of equal thickness throughout its entire length, making the action of the spring unequal.

What I claim as new, and desire to secure by Letters Patent, is—

The cushion B, having the inserted spring $c$ and paralleled hole $e$ through its entire length near the spring $c$, substantially as and for the purpose described.

JOHN GEORGE HERMANN MEYER. [L. S.]

Witnesses:
JNO. L. BOONE,
GEO. H. STRONG.